(12) United States Patent
Nistér et al.

(10) Patent No.: US 6,952,212 B2
(45) Date of Patent: Oct. 4, 2005

(54) FRAME DECIMATION FOR STRUCTURE FROM MOTION

(75) Inventors: David Nistér, Uppsala (SE); Torbjörn Einarsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 568 days.

(21) Appl. No.: 09/808,018

(22) Filed: Mar. 15, 2001

(65) Prior Publication Data

US 2001/0031005 A1 Oct. 18, 2001

Related U.S. Application Data

(60) Provisional application No. 60/191,714, filed on Mar. 24, 2000.

(51) Int. Cl.[7] .............................................. G09T 13/00
(52) U.S. Cl. ...................................... 345/474; 348/700
(58) Field of Search ......................... 348/558, 152–156, 348/700; 345/473; 375/240.01, 240.13, 240.12; 715/500.1; 382/225, 103, 236; 386/4, 52

(56) References Cited

U.S. PATENT DOCUMENTS

| 6,600,835 B1 * | 7/2003 | Ishikawa | ..................... | 382/236 |
| 6,707,852 B1 * | 3/2004 | Wang | ..................... | 375/240.12 |
| 6,724,433 B1 * | 4/2004 | Lippman | ..................... | 348/558 |

FOREIGN PATENT DOCUMENTS

| EP | 0 907 144 A | 4/1999 |
| WO | 98/21688 | 5/1998 |

OTHER PUBLICATIONS

Wolf, "*Key frame selection by motion analysis*", 1996 IEEE International Conference on Acoustics, Speech, and Signal Processing Conference Proceedings, vol. 2, May 7–10, 1996, pp. 1228–1230.

Koch R et al., "*Realistic 3–D scene modeling from un calibrated image sequences*", ICIP 99. Proceedings 1999 International Conference, vol. 2, 1999, pp. 500–504.

Pollefays, Marc, et al. "Self–Calibaration and Metric Reconstruction Inspite of Varying and Unknown Intrinsic Camera Parameters." International Journal of Computer Vision, 32(1), 7–25, (1999), Kluwer Academic Publishers, The Netherlands, pp. 9–25.

(Continued)

*Primary Examiner*—Mark Zimmerman
*Assistant Examiner*—Lance W. Sealy

(57) ABSTRACT

A preprocessing mechanism automatically processes a video sequence in order to obtain a set of views suitable for structure from motion (SaM) processing. The preprocessor employs a frame decimation algorithm which removes redundant frames within the video sequence based on motion estimation between frames and a sharpness measure. The motion estimation can be performed either globally or locally. The preprocessor can be configured to process static video sequences (i.e., previously acquired/captured) to select a minimal subsequence of sharp views form the video sequence, or to process the frames of a video sequence as they are being captured to discard frames which are redundant. In either configuration, the goal of the preprocessor is to select a minimal sequence of sharp views tailored for SaM processing.

16 Claims, 12 Drawing Sheets

OTHER PUBLICATIONS

Fitzgibbon, Andrew W., et al. "Automatic Camera Recovery for Closed or Open Image Sequences." Robotics Research Group, Department of Engineering Science, University of Oxford, Oxford, UK.

Nistér, David. "Reconstruction from Uncalibrated Sequences with a hierarchy of Trifocal Tensoros." Visual Technology, Ericsson Research, Ericsson Radio Systems, Stockholm Sweden.

Sawhney, Harpeet S., et al. "Robust Video Mosaicing through Topology Inference and Local to Global Alignment." Vision Technologies Laboratory, Sarnoff Corporation, CN5300, Princeton, NJ.

Szeliski, Richard, et al. "Creating Full View Panoramic Image Mosaics and Environment Maps." Microsoft Research, ACM, Inc. ACM–0–89791–896–7/97/008 (1997), pp. 251–258.

Van Gool, Luc., ESAT–M12, Kath. Universiteit Leuven, Leuven, Belgium and Andrew Zisserman, Robotics Research Group, Dept. of Engineering Science, University of Oxford, Oxford, UK. "Automatic 3D Model Building from Video Sequences." EU Acts Project AC074 "VANGUARD" vol. 8, No. 4, Jul.–Aug. 1997, pp. 369–378.

* cited by examiner

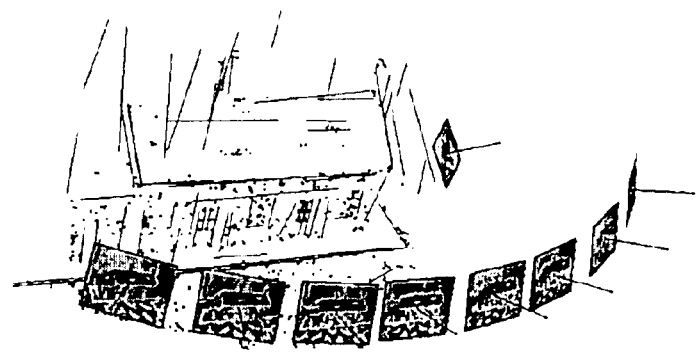
Figure 7. Final reconstruction of House.
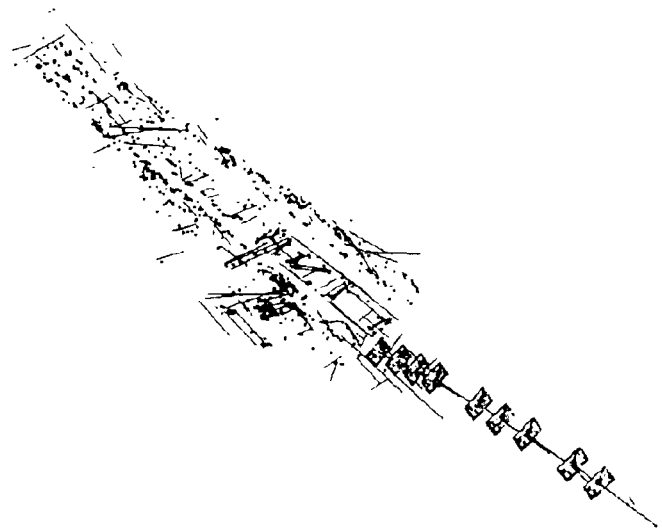
Figure 8. Final reconstruction of Basement.

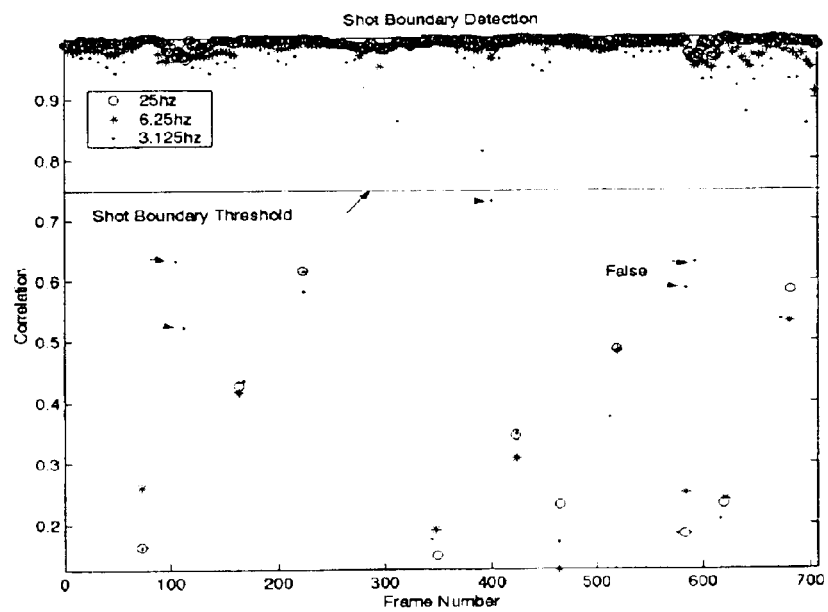
Figure 9. Result of shot boundary detection on the sequence Sceneswap.
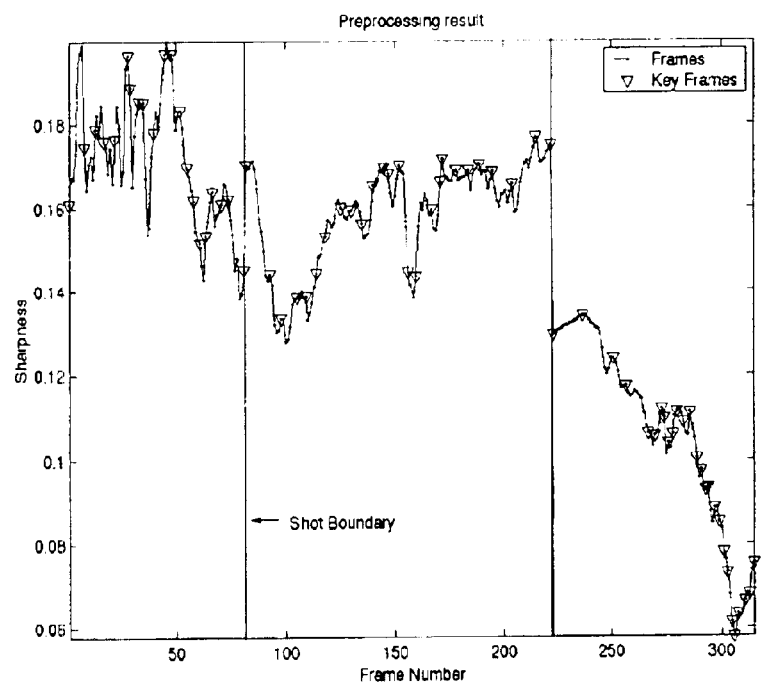
Figure 10. Preprocessor result for the sequence TriScene.

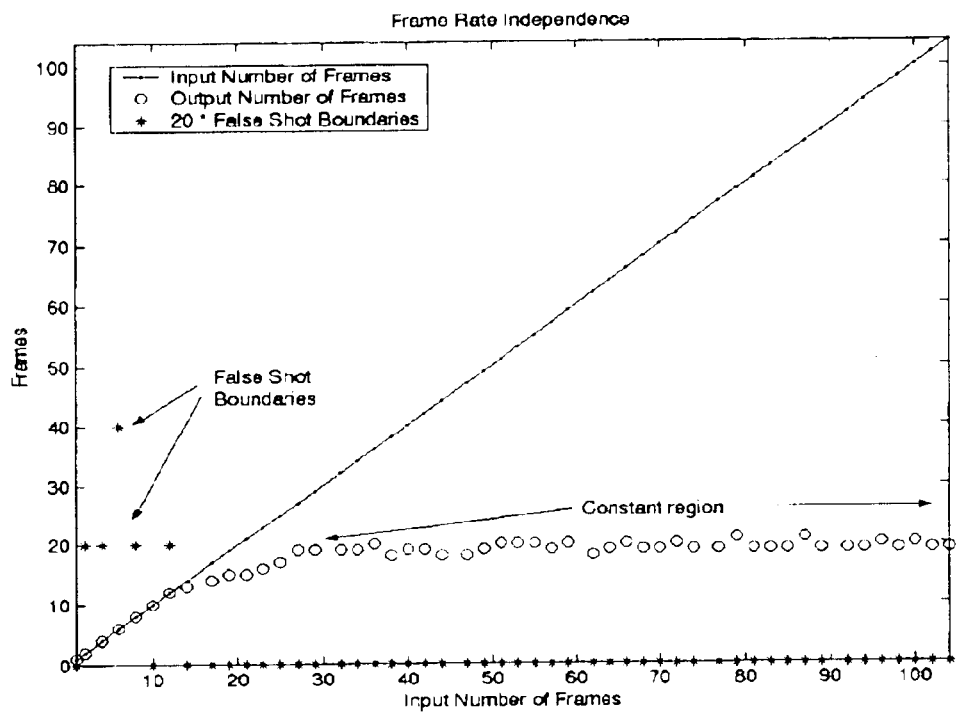
Figure 11. Frame rate independence for the sequence Stove.
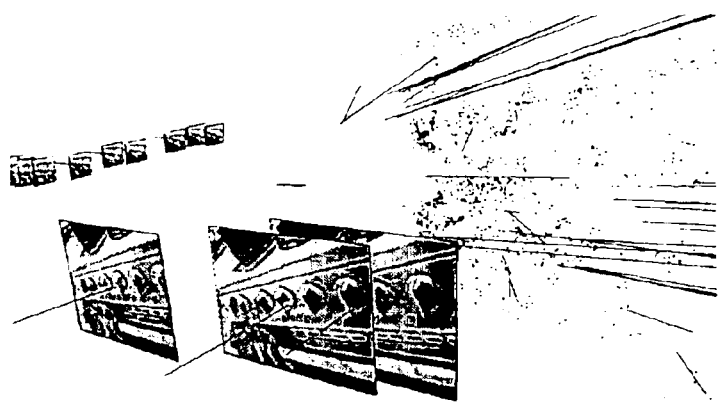
Figure 12. Final reconstruction of Stove.

Figure 13. Final reconstruction of Room.
Figure 14. Side view of reconstruction of David.
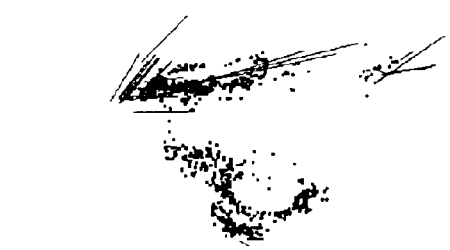
Figure 15. Top view of reconstruction of David.

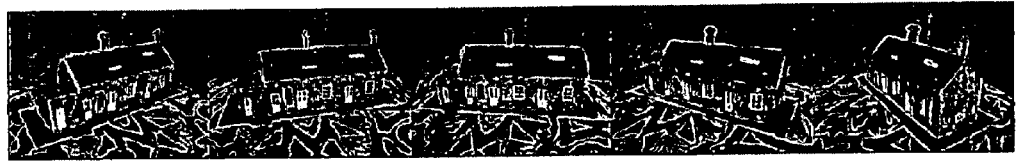
Some frames from House.
Some frames from Basement.
One frame from each shot of the sequence Sceneswap.
Two frames from each shot of the sequence TriScene.
Some frames from Room.
Some frames from Stove.
Some frames from David
Figure 16

Data for Test Sequences

| Name | Length | Resolution | Type |
| --- | --- | --- | --- |
| House | 10 | 768 x 576 | Turntable |
| Basement | 11 | 512 x 512 | Autonom. Vehicle |
| Sceneswap | 748 | 352 x 288 | Handheld |
| TriScene | 315 | 352 x 288 | Handheld |
| Room | 99 | 352 x 288 | Handheld |
| Stove | 107 | 352 x 288 | Handheld |
| David | 19 | 352 x 288 | Handheld |

Figure 17

FRAME DECIMATION FOR STRUCTURE FROM MOTION

This application claims benefit of application Ser. No. 60/191,714 filed Mar. 24, 2000.

FIELD OF THE INVENTION

The present invention relates to the field of three-dimensional (3D) modeling. More particularly the present invention relates to the estimation of 3D structure from the images of a video sequence.

BACKGROUND

In the computer vision community, research is currently very active regarding structure from motion, particularly the estimation of 3D structure from the images of a video sequence. The interest of the Structure from Motion (SaM), also referred to as Structure and Motion, branch of computer vision has recently shifted to developing reliable and practical SaM algorithms and to building systems which incorporate such algorithms. Further, special interest has been devoted to developing systems which are capable of processing video images directly from an initially uncalibrated camera to automatically produce a three-dimensional graphical model. Great advances have been made towards these goals, as reflected in the number of SaM algorithms which have been developed. For example, the algorithm disclosed by Fitzgibbon et al. in "Automatic Camera Recovery for Closed or Open Loop Image Sequences", Proc. ECCV 1998, and the algorithm discussed by Pollefys et al. in "Self-calibration and Metric Reconstruction in Spite of Varying and Unknown Internal Camera Parameters", IJCV, August 1999, both of which are incorporated herein by reference.

Typical structure from motion algorithms match points between images that are projections of the same point in space. This in turn enables triangulation of depth, in the same way as the human brain performs stereo vision. The result of SaM processing is a three-dimensional textured model of the structure seen in the images. The position and calibration of the projections that produced the images can also be retrieved. However, many of the SaM algorithms perform best when supplied with a set of sharp, moderately interspaced still images, rather than with a raw video sequence. Therefore choosing a subset of frames from a raw video sequence can produce a more appropriate input to these algorithms and thereby improve the final result.

One way to obtain a smaller set of views (i.e., a subset of frames), is simply to use a lower frame rate than the one produced by the camera. However, this is inadequate for several reasons. First, it can lead to unsharp frames being selected over sharp ones. Second, it typically means that an appropriate frame rate for a particular shot has to be guessed by the user or even worse, predefined by the system. In general, the motion between frames has to be fairly small to allow automatic matching, while significant parallax and large baseline is desirable to get a well-conditioned set of views (i.e., sequence of frames). If the frame rate is too low, matching between the image can be difficult if not impossible. However, with high frame rates (e.g., the full frame rate of a video camera) memory is quickly and sometimes needlessly consumed. Further, higher frame rates, while necessary in some situations, often result in a large abundance of similar views, which can produce problems, not only in terms of memory requirements, but in terms of processing requirements and/or numerical stability as well.

Accordingly, with high frame rates, an unnecessarily large set of views is produced and with low frame rates, the connectivity between frames is jeopardized. In fact, the appropriate frame rate depends on the motion and parallax of the camera and can therefore vary over a sequence.

In practice, it is impossible to know in advance the appropriate frame rate at which a handheld video sequence should be grabbed, inasmuch as the appropriate frame rate depends on the motion of the camera and the imaged structure. Furthermore, the appropriate frame rate can vary within a sequence as well as from one sequence to another. Therefore, additional mechanisms are necessary in order to incorporate raw video sequences into a full working SaM algorithms system.

SUMMARY OF THE INVENTION

As a solution to the above-described problems, a mechanism is provided that produces a sparse but sufficient set of views suitable for SaM processing.

In exemplary embodiments, the preprocessing mechanism (herein referred to as the preprocessor) is configured to process previously acquired (i.e., captured) video sequences to select a minimal subsequence of sharp views from the video sequence.

In other exemplary embodiments, the preprocessor is configured to process a video sequence as it is being captured to discard frames which are redundant. Thereby providing a minimal sequence of sharp views tailored for SaM processing.

Acquiring structure from motion using video sequences, especially for handheld video sequences, is more practical using the preprocessor of the present invention. For example, the relatively expensive SaM processing noted above can be performed on a smaller subsequence of views provided by the preprocessor. Further, the tedious manual tasks, such as segmentation of the raw video material into shots and the choice of frame rate for each shot, required to be preformed on the sequences prior to SaM processing are automated using the preprocessor.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 7 shows the final reconstruction results for the sequence House;

FIG. 8 shows the final reconstruction results for the sequence Basement;

FIG. 9 shows shot boundary detection results on the sequence Sceneswap;

FIG. 10 shows shot boundary detection results on the 25 Hz sequence TriScene;

FIG. 11 shows shout boundary detection results on the sequence Stove at multiple frame rates;

FIG. 12 shows the final reconstruction results for the sequence Stove;

FIG. 13 shows the final reconstruction results for the sequence Room;

FIG. 14 shows the final reconstruction results for the sequence David from the side view;

FIG. 15 shows the final reconstruction results for the sequence David from the top view;

FIG. 16 shows selective frames from the test video sequences;

FIG. 17 shows the data for various test sequences.

DETAILED DESCRIPTION OF THE INVENTION

In the following description, for purposes of explanation and not limitation, specific details are set forth, such as particular circuits, circuit components, techniques, steps etc. in order to provide a thorough understanding of the present invention. However, it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

These and other aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits, by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention.

In general the present invention relates to frame decimation. More particularly, the present invention relates to a preprocessor configured to perform frame decimation in order to select a sequence of frames with appropriate amounts of motion between neighboring frames within the sequence for SaM processing.

An ideal preprocessor is idempotent. An operator T is called idempotent if $T^2=T$. In other words, applying the preprocessor twice should yield the same result as applying it once. This is a quality possessed by, for example, ideal histogram equalization or ideal bandpass filtering. Another desirable property of the preprocessor is that the frame decimation algorithm should produce similar output at all sufficiently high input frame rates (i.e., at all frame rates higher than the minimum required to allow automatic matching between frames). Furthermore, the preprocessor should not significantly affect data that does not need preprocessing.

Figure 1:
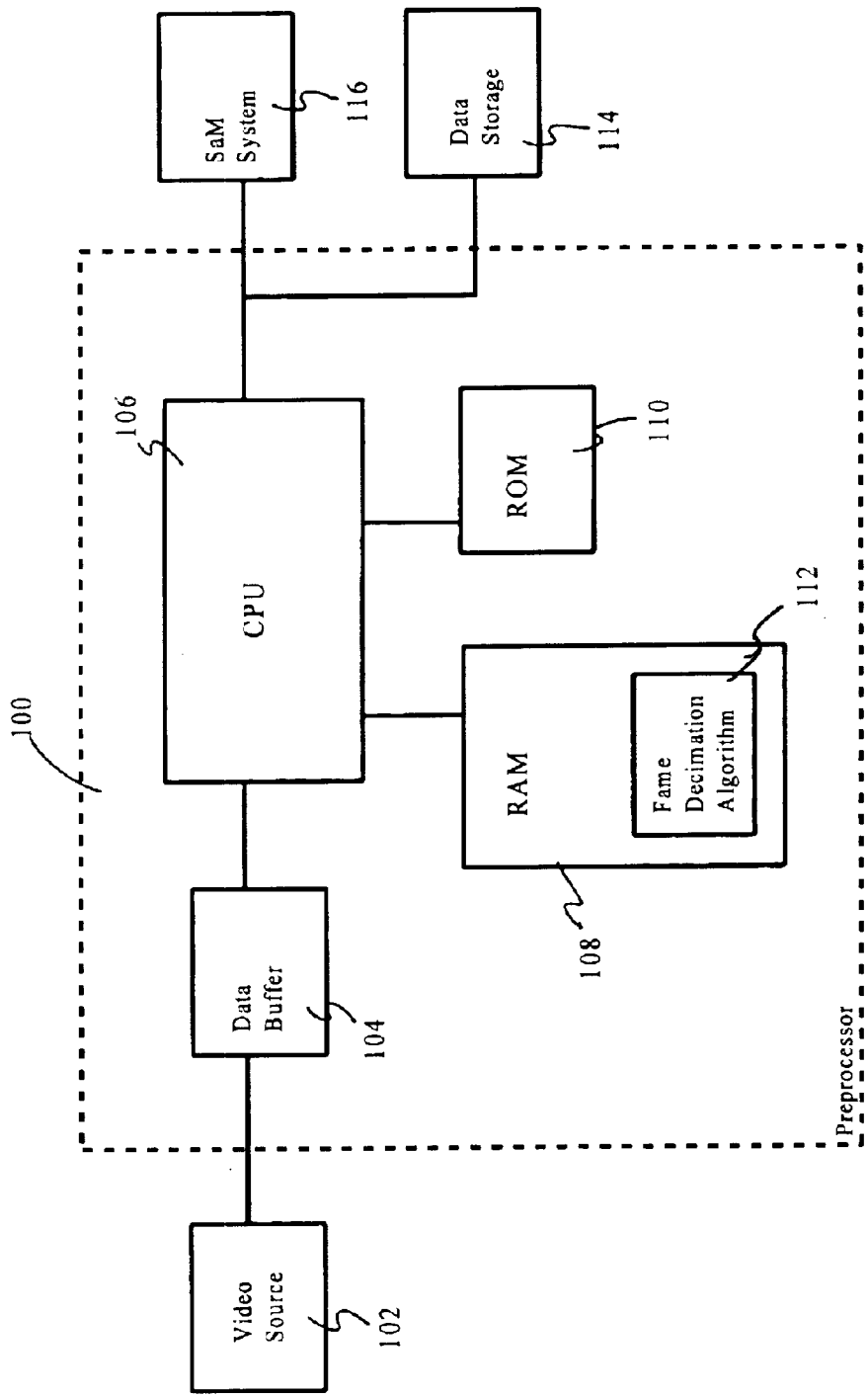
FIG. 1 shows a block diagram of a preprocessing device according to an embodiment of the present invention.

FIG. 1 shows a block diagram of a preprocessor 100 according to an embodiment of the present invention. Data buffer 104 receives frames, or sequences of frames, from video source 102. Video source 102 may be static or dynamic. For example, video source 102 can be a data store wherein previously capture video sequences are stored and subsequently feed into data buffer 104. Alternatively, video source 102 can be a handheld camera wherein video is feed directly into data buffer 104. Central Processing Unit (CPU) 106 executes the frame decimation algorithm 112, stored in random access memory (RAM) 108, prior to providing the frames received in data buffer 104 to SaM system 116 or data storage 114. SaM system 116 can be any type of structure from motion algorithm, device, or system, now known or later developed. The preprocessor 100 can be integrated directly into a video camera, a video grabbing chip, or a user terminal, such as a laptop computer, mobile phone, video phone or home computer.

According to one embodiment of the present invention, the preprocessor is used to process static, or previously captured, video sequences in order to acquire a subsequence of frames which are suited for SaM processing. A first step in preparing a previously captured video sequence for SaM preprocessing is to detect the shot boundaries, if any. Shot boundaries occur when the camera has been stopped and then started again at a new position. The video sequence could be partitioned into shots by the camera, but in practice this is not always the case, specifically when the camera is a general purpose handheld video camera. Further, with large amounts of video (e.g., a raw video sequence from a handheld camera), it is rather tedious to start and stop frame grabbing to partition the material into shots. Therefore, according to one embodiment of the present invention illustrated in FIG. 2, the shot boundaries are derived automatically using the preprocessor.

Figure 2:
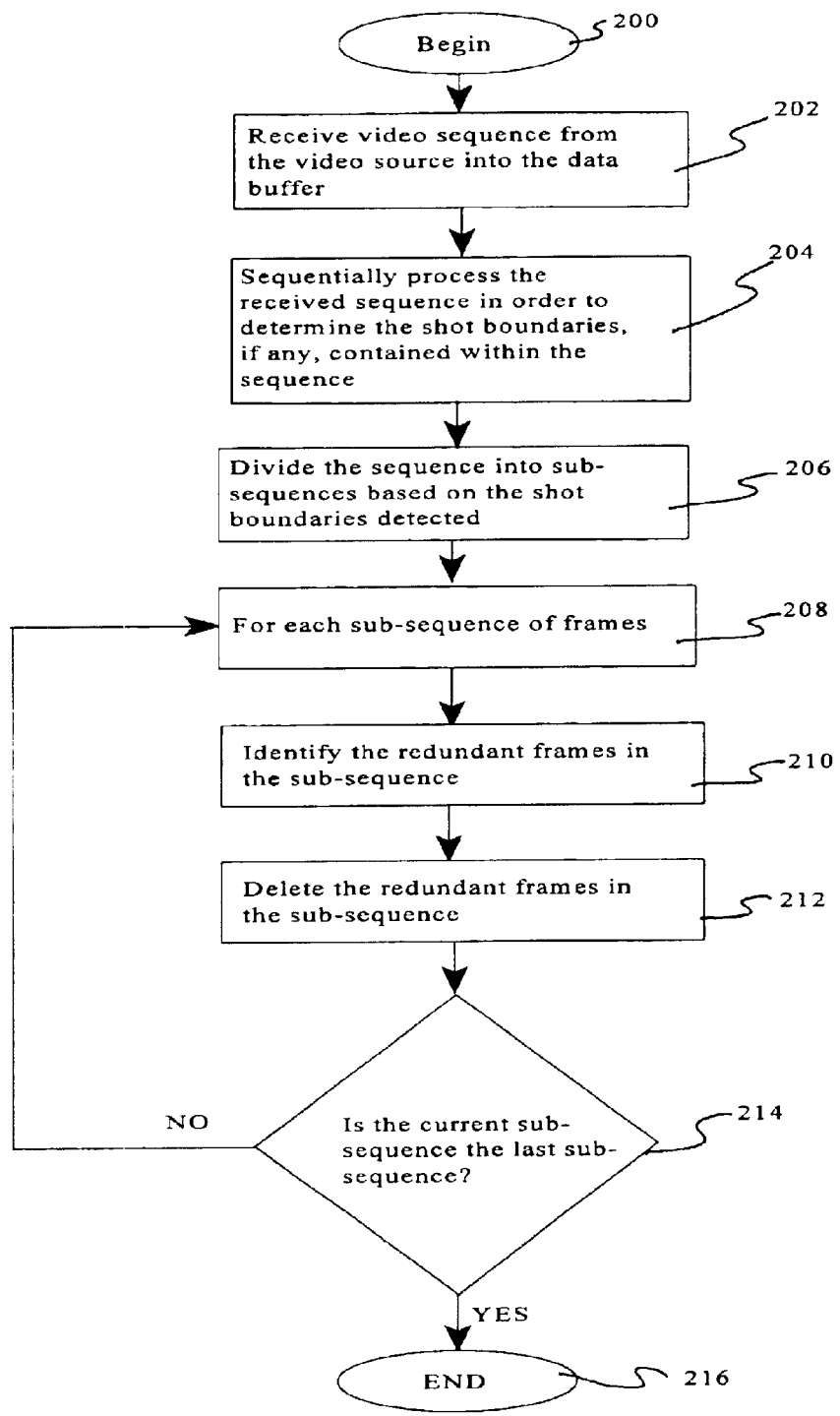
FIG. 2 shows a flow chart describing a frame decimation algorithm according to an embodiment of the present invention.

As shown in FIG. 2, a video sequence is received into the buffer from the video source at step 202. At step 204, the preprocessor sequentially processes the frames of the received sequence to determine the shot boundaries within the sequence, if any. Shot boundaries are detected, at step 204, by evaluating the correlation between adjacent frames after global motion compensation (described below). If the correlation is below a threshold (e.g., $t_1=0.75$), the second frame is declared the beginning of a new shot. The correlation can be measured by the same mean square measure that is used for the motion estimation, however, the normalized correlation coefficient is preferred, as it yields a more intuitively interpretable value.

If shot boundaries are detected, the received sequence is divided into subsequences based on the shot boundaries (i.e., each subsequence corresponds to a shot sequence) at step 206. Control then proceeds to step 208, wherein processing continues separately for each subsequence (or for the received sequence if no shot boundaries were detected). At step 210, the subsequence is processed to identify redundant frames. The redundant frames, if any, are then discarded at step 212. If additional subsequences exist, then control returns to step 208.

With regard to the detection of shot boundaries at step 204, it should be mentioned that since a video sequence is discretely sampled in time, a shot boundary is not strictly defined. Therefore, automatic detection of shot boundaries can be done more reliably at high frame rates, since the difference between a discrete swap of the camera or view and a large motion diminishes towards lower frame rates.

The processing of steps 208–214 is based on a rough global estimation of the rotational camera motion between frames and a sharpness measure. The global motion estimation can be calculated using the initial step of a coarse to fine, optical flow based, video mosaicing algorithm, similar to the alogrithm disclosed by Sawhney et al. in "Robust Video Mosaicing through Topology Inference and Local to Global Alignment" ECCV 1998, or by Szeliski et al. in "Creating Full View Panoramic Image Mosaics and Environment Maps" Proc. SIGGRAPH 1997, both of which are incorporated herein by reference. The motivation for using a flow based approach over a feature based in this case is that the flow based approach is also good for significantly unsharp frames and it is easy to obtain fast approximations by downsampling the frames (i.e., decreasing the number of pixels). The motion model is an arbitrary rotation of the camera around the center of projection and an arbitrary change of linear calibration. Assuming also a rigid world, this is equivalent to a homographic mapping H, represented by a 3×3 matrix, between the homogenous image coordinates $x_1$ and $x_2$ of the first and second frame as $$x_2 \cong H x_1,$$

where $\cong$ denotes equality up to scale. Both the images are downsampled to a small size, for example, 50×50 pixels. To avoid problems due to altered lighting and overall brightness, both images are also normalized to have zero mean and unit standard deviation. The mapping H has eight degrees of freedom and should be minimally parameterized. As only small rotation is expected, this can be done by setting $H_{33}=1$. The minimization criterion applied to the estimation of H is the mean square residual. Alternative measures exists, which provide more accurate results, however, the above is appropriate for obtaining a rough estimation quickly. The mean square residual R between the image functions $f_1$ and $f_2$, using H for the correspondence is $$R(f_1, f_2, H, \Theta) = \frac{1}{\#(\Theta)} \sum_{x \in \Theta} (f_2(Hx) - f_1(x))^2.$$

Here, $\Theta$ is all or a subset of the set $\Theta_A$ of pixels in the first image that are mapped into the second image and $\#(\Theta)$ is the number of element of $\Theta$. Larger sets than $\Theta_A$ are also possible if the image functions are defined beyond the true image domain by some extension scheme. In this case, $\Theta$ was chosen to be the whole image, except for a border of width d, which is a maximal expected disparity. The unit matrix is used as the initial estimate of H. Then, R is minimized by a non linear least squares algorithm such as Levenberg-Margquardt (See Press et al., "Numerical Recipes in C" Cambridge University Press 1998).

The measure of image sharpness can be a mean square of the horizontal and vertical derivatives, evaluated as finite differences. More exactly $$S(f, I) = \frac{1}{2\#(I)} \sum_{(x,y) \in I} (f(x+1, y) - f(x-1, y))^2 + (f(x, y+1) - f(x, y-1))^2$$

where I is the whole image domain except for the image boundaries and x, y are image coordinates. This measure is not used in any absolute sense, but only to measure the relative sharpness of similar images.

While the shot boundary detection of steps 204 and 206 is performed in a purely sequential manner, the algorithm for selecting key frames in steps 208–214 operates in a batch mode. Each frame in the subsequence is traversed in order of increasing sharpness and the redundant frames are deleted at step 212.

A redundant frame is defined as a frame which is not essential for the connectivity of the sequence. For example, consider the frame $F_i$ belonging to the subsequence $\{F_n\}^N_{n=1}$ of frames. If i=1 and i=N (i.e., the first and last frames of the sequence), the frame is not redundant. Otherwise, a global motion estimation (as discussed above) is performed between frame $F_{i-1}$ and frame $F_{i+1}$. If the motion estimation yields a final correlation coefficient above a threshold (e.g., $t_2=0.95$) and the estimated mapping H does not violate the maximum expected disparity d at any point, the frame $F_i$ is redundant. The value of d is ten percent of the image size, which is half of the maximum disparity expected by the SaM algorithm.

This process is repeated for each frame in the sequence, and frames are deleted until further deletions result in too high a discrepancy between neighboring frames. The discrepancy that prevents a deletion can be either a violation of the disparity constraint or significant parallax that causes the global motion estimation, with the assumption of camera rotation, to break down. In the latter case, the material has become suitable for a SaM algorithm. In the former case, the material is ready for SaM or possibly mosaicing.

In another embodiment of the present invention, the preprocessor is implemented to run in real-time. The preprocessor can adapt to the motion of the camera and avoid any undue assumptions about the input frame rate. Furthermore, unsharp frames caused by bad focus, motion blur, etc. or a series of frames with low interdisparity can be discarded at an early stage.

The preprocessor together with the camera then becomes an appropriate rate camera. When the camera moves slower, fewer frames are produced, while still maintaining the connectivity of the sequence. Longer sequences can therefore be acquired before running out of RAM-memory when using digital cameras or the like. It also improves the chances of storing the sequence to disk in real-time, which can not be done with full rate video and present user terminal disk speeds. In fact, this could be done in conjunction with a signal to the acquiring user to slow down the camera motion when memory is running out.

In order to configure the preprocessor to use frame decimation to avoid saving or storing the complete video sequence during the capture of the video sequence (i.e., real-time frame decimation), an algorithm has to be chosen that uses only a limited number of recent frames to perform frame decimation (as opposed to the batch algorithm described above with respect to the static video which uses all of the frames in the sequence). The idea is to perform the frame decimation in real-time so that only a fraction of the new incoming frames have to be stored in memory or saved to disk.

As with the static frame decimation algorithms discussed above, the real-time frame decimation algorithms described below use an image sharpness measure and a motion estimation algorithm. The difference between two images (i.e., frames) after motion compensation could be measured either globally or locally. If it is measured locally, it is reasonable to consider two frames to be different when any local part differs significantly. The sharpness measure could also be disregarded and the frames traversed in any order.

Figure 3:
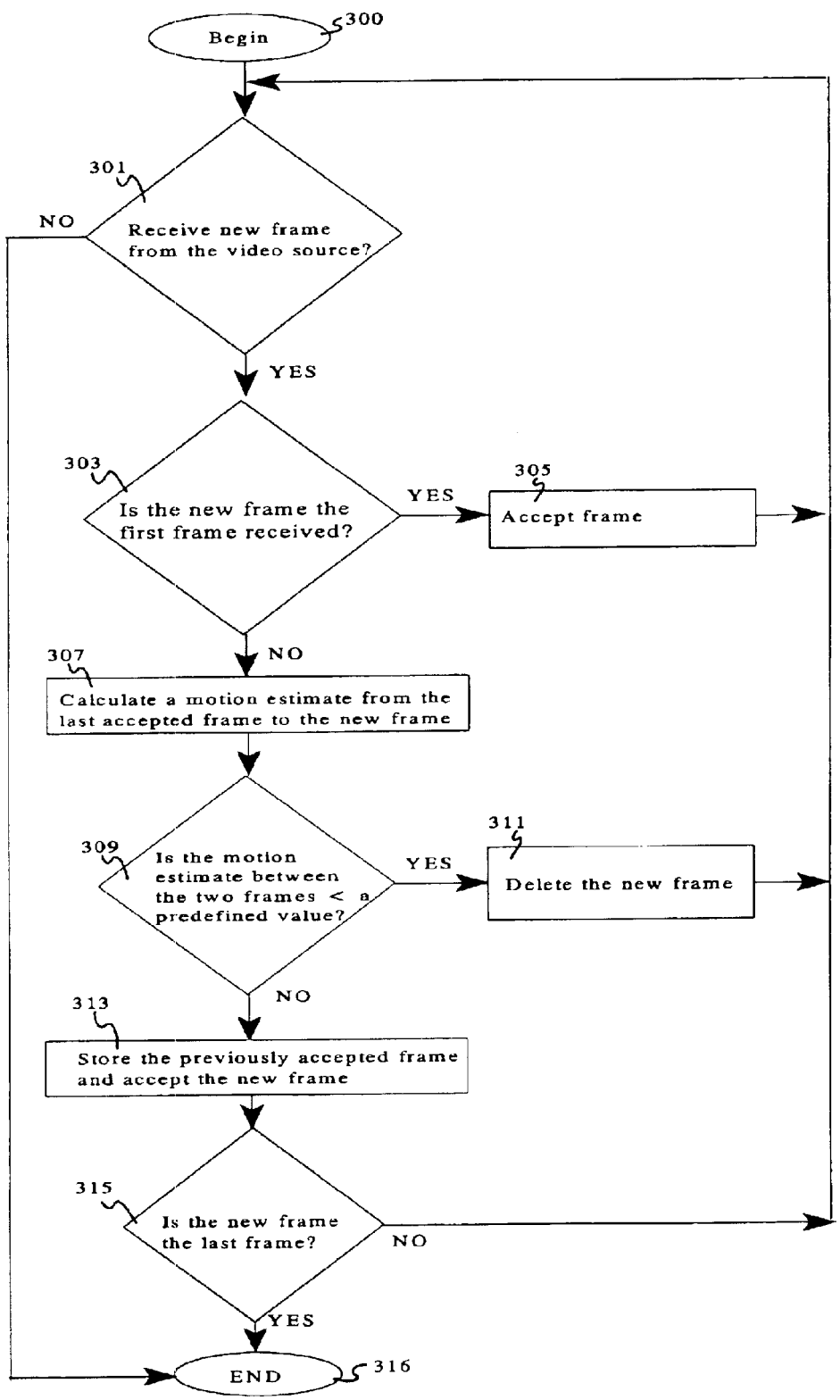
FIG. 3 shows a flow chart describing a frame decimation algorithm according to an alternative embodiment of the present invention.

FIG. 3 illustrates a real-time frame decimation algorithm according to a second embodiment. As shown in FIG. 3, which begins at step 300, a new frame is received from the video source at step 301. At step 303, if the new frame is the first frame of a sequence, then control proceeds to step 305 where the new frame is accepted (i.e., retained in the buffer), thereafter control returns to step 301 where a new frame is received. If the new frame is not the first frame of the sequence, then control proceeds to step 307, where a motion estimate from the accepted frame (i.e., the other frame in the buffer) to the new frame is calculated. At step 309, the motion estimate calculated at step 309 is compared to a predefined value. If the motion estimate is less than the predefined value (i.e., there is little difference between the two frames), then the new frame is discarded at step 311 and control returns to step 301. If the motion estimate is greater than the predefined value, then the previously accepted frame is stored and the new frame is accepted (i.e., retained in the buffer). If the new frame is not the last frame of the sequence, control returns to step 301.

Fame decimation algorithms, such as the one illustrated in FIG. 3, are advantageous in systems where the memory resources are small due to the fact that the buffer only stores two frames at a time, i.e., the last accepted frame and the new frame. However, in systems where more robust memory and processing power are available, alternative algorithms can be employed. For example, those algorithms illustrated in FIG. 4 and FIG. 5.

Figure 4:
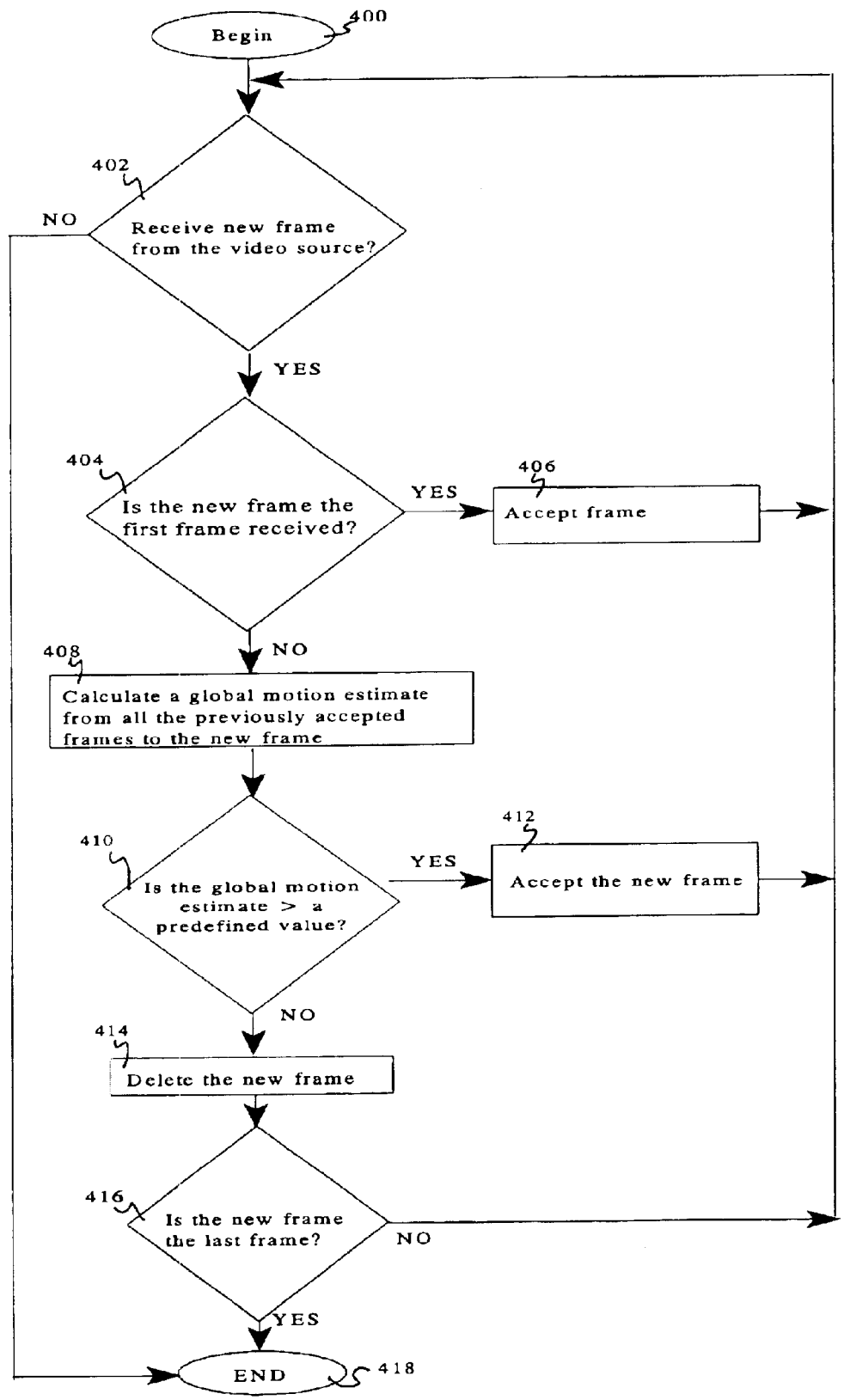
FIG. 4 shows a flow chart describing a second frame decimation algorithm according to an alternative embodiment of the present invention.

FIG. 4 shows a flow chart describing a second algorithm for use in a real-time frame decimation. As shown in FIG. 4, which begins at step 400, a new frame is received from the video source at step 402. If the new frame is the first frame of a sequence, then control proceeds to step 406 where the new frame is accepted (i.e., retained in the buffer), thereafter control returns to step 402. If the new frame is not the first frame of the sequence, then control proceeds to step 408, where a global motion estimate from all the previously accepted frames (i.e., all the frames in the buffer) to the new frame is calculated. At step 410, the global motion estimate, calculated at step 408, is compared to a predefined value. If the global motion estimate is greater than the predefined value (i.e., there is a significant difference between the new frame and the previously accepted frames), then the new frame is accepted at step 412 and control returns to step 402. If the global motion estimate is less than the predefined value, then the new frame is discarded at step 414. If the new frame is not the last frame of the sequence, control returns to step 402.

Figure 5:
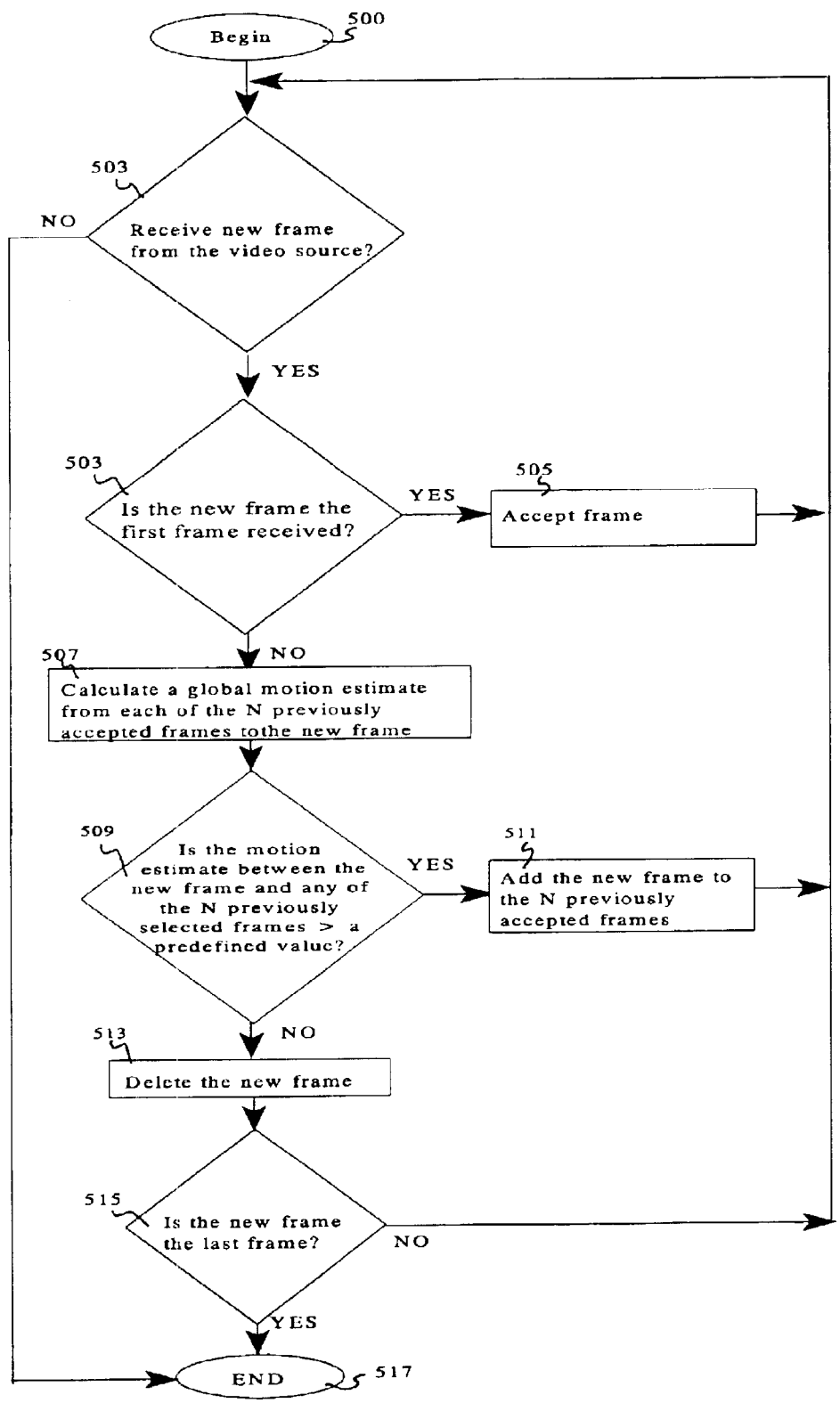
FIG. 5 shows a flow chart describing a third frame decimation algorithm according to an alternative embodiment of the present invention.

FIG. 5 shows a flow chart describing a third algorithm for use in a real-time frame decimation. As shown in FIG. 5, which begins at step 500, a new frame is received from the video source at step 501. If the new frame is the first frame of a sequence, then control proceeds to step 505 where the new frame is accepted (i.e., retained in the buffer), thereafter control returns to step 501. If the new frame is not the first frame of the sequence, then control proceeds to step 507, where a motion estimate from each of the N previously accepted frames (i.e., every frame retained in the buffer) to the new frame is calculated. At step 509, the motion estimates, calculated at step 509, are compared to a predefined value. If any one of the motion estimates is greater than the predefined value (i.e., there a significant difference between the new frame and any one of the previously accepted frames), then the new frame is accepted (i.e., added to the N frames retained in the buffer) at step 511 and control returns to step 501. Otherwise, the new frame is discarded at step 513. If the new frame is not the last frame of the sequence, control returns to step 501.

To simplify the motion estimation process, the motion estimation can be performed as a form of tracking from the most recent accepted frame across any rejected frames to the newest frame. Then the motion estimate is updated for every new frame by effectively performing a motion estimation between the most recent frame and the new frame (that is, the last two frames), as illustrated in FIG. 6.

Figure 6:
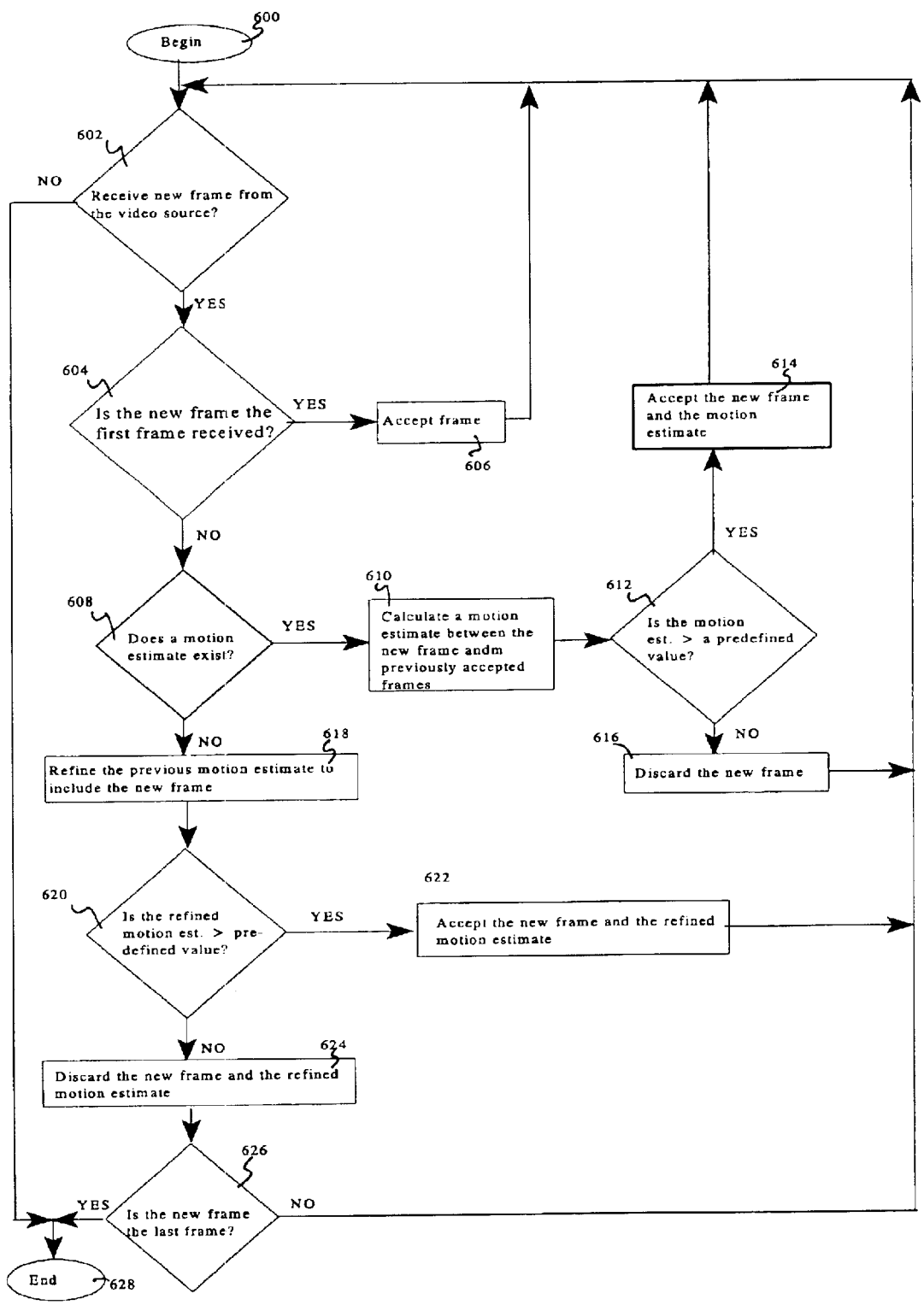
FIG. 6 shows a flow chart describing a fourth frame decimation algorithm according to an alternative embodiment of the present invention.

As shown in FIG. 6, which begins with step 600, a new frame is received from the video source at step 602. If the new frame is the first frame of a sequence, then control proceeds to step 606 where the new frame is accepted (i.e., retained in the buffer), thereafter control returns to step 602. If the new frame is not the first frame of the sequence, then control proceeds to step 608, where it is determined whether or not a previous motion estimate has been calculated. If a previous motion estimation does not exist, then control proceeds to step 610, where a motion estimate between the new frame and the previously accepted frames is calculated. At step 612, if the motion estimate is greater than a predefined value, then, at step 614, the motion estimate and the new frame are accepted (i.e., stored in the buffer). Otherwise, the new frame and the motion estimate calculated at step 610 are discard at step 616 and control returns to 602. If, at step 608, a previous motion calculation exists, then the previous motion calculation is refined to include the new frame at step 618. At step 620, the refined motion estimate is compared to a predefined value. If the refined motion estimate is greater than the predefined value, then the refined motion estimate and the new frame are accepted at step 622 and control returns to step 602. Otherwise the refined motion estimate and the new frame are discarded at step 624. If the new frame is not the last frame of the sequence, then control returns to 602.

While the various frame decimation algorithms described above address various configuration of memory and processing power, they fail to address the speed of the storage device. Therefore, a mechanism is included in the system in order to alert the user (cameraman) when the storage device can not keep up. The cameraman should then stop the camera motion for a period of time. The frame decimation scheme can as a result skip the majority (if not all) of the incoming frames and the storage device can catch up.

With respect to results obtained when the techniques described above are applied, attention is first turned to a theoretical result. The preprocessing algorithm is approximately idempotent and can be made perfectly idempotent by a modification. Instead of only executing one run over all frames to perform deletions, the process is repeated until no additional deletions occur. The algorithm is now perfectly idempotent. To see why, consider application of the preprocessor a second time. No shot boundaries will be detected, because all adjacent frames with a correlation less then $t_1$ after motion compensation were detected in the first pass and no new such pairs have been created by frame deletion, since $t_2 > t_1$. Neither do any frame deletions occur during the second pass, since this was the stopping criterion for the first pass.

In practice extra deletion runs are not performed since they result in few deletions. When a frame $F_i$ is considered for deletion during additional runs, correlation after compensation is calculated between two frames $F_{i-1}$ and $F_{i+1}$. These two frames are always at least as far apart in the sequence as the pair used during any of the preceding runs. New deletions therefore seldom occur.

Let us now turn to the practical experiments. The results of a preprocessor are not strictly measurable unless the type of subsequent processing is defined. The experiments were performed in conjunction with a feature based SaM algorithm. The algorithm takes a video sequence and automatically extracts a sparse representation in terms of points and lines of the observed structure. It also estimates camera position, rotation and calibration for all frames. The preprocessor was tested on approximately 50 sequences, most of them handheld with jerky motion and imperfect focus. The sequences listed in the table shown in FIG. 17 are discussed below. Some frames from the sequences are shown in FIG. 16 and outlined in the Table of FIG. 17.

As was mentioned in the introduction, the preprocessor should not significantly change data that does not need preprocessing. This was tested in practice by applying the preprocessor and subsequent SaM system to sequences with sharp, nicely separated frames and no shot boundaries. Final reconstruction results for the sequence House are shown in FIG. 7. The cameras are represented by an image plane with the actual image projected onto it and a line drawn to the center of projection. For this sequence, the preprocessor does not falsely detect any shot boundaries, nor does it remove any frames. In other words, it just propagates the input data to its output, which is exactly the desired behavior. The last camera to the right is completely off the true turntable track. This error unfortunately occurs when going from projective to Euclidean reconstruction, but has nothing to do with the preprocessor.

The final reconstruction result for the sequence Basement is depicted from above in FIG. 8. An autonomous vehicle acquired this sequence while moving through a corridor, turning slightly left. Again, the preprocessor did not falsely detect any shot boundaries. However, it deleted frames 3 and 7, which can in fact be seen as larger gaps in the camera trajectory. This happens because the forward motion does not cause enough parallax. It does not negatively affect the final result.

Experimental results of shot boundary detection on the sequence Sceneswap is shown in FIG. 9. This sequence consists of eleven shots, separated by shot boundaries after frame 72, 164, 223, 349, 423, 465, 519, 583, 619 and 681 (found manually). The threshold at 0.75 is shown as a solid line. Results are given at frame rates 2.5, 6.25 and 3.125 Hz. At all frame rates, the ten boundaries are found successfully and can be seen as ten groups of three markers below the detection threshold at the above mentioned frame numbers. At 2.5 and 6.25 Hz the detection is stable, with a correlation above 0.95 and 0.9, respectively, for all non-boundaries. This can be seen as a pattern at the top of the figure. At 3.125 Hz however, the frame rate has dropped two and five false responses occur, all marked with an arrowhead. Thus the importance of a high frame rate is illustrated.

A typical preprocessor result is shown in FIG. 10 for the 25 Hz sequence TriScene, with two correctly detected shot boundaries. The frames surviving the decimation are marked by triangles. Sharpness is on the vertical axis. Observe that local sharpness minima are avoided.

In FIG. 11, it is illustrated how the preprocessor manages to make the system independent of the input frame rate, provided that this is sufficiently high. The result is for the 12.5 Hz sequence Stove, with a total of 107 frames. The sequence is handheld, with the camera moving in an arc in front of a kitchen stove. The sequence was subsampled to 50 lower frame rates and fed into the preprocessor. With very few input frames (<12), shot boundaries are falsely detected. With the number of input frames higher than 30 however, this is no longer a problem and the number of output frames remains fairly constant at about 20. When fed with the full frame rate, the preprocessor removes about 80% of the frames and the SaM algorithm can then carry on to produce the reconstruction shown in FIG. 12. The beginning of the camera arc can be seen at the front of the figure. The camera then travels out of view and returns at the back of the figure.

In FIG. 13, the reconstruction from the sequence Room is shown. This is a handheld sequence, where the camera moves forward through an office. Many frames are out of focus. At the beginning and the end of the sequence, the camera moves very little and only rotates slightly back and forth, which is not uncommon in raw video material. The preprocessor successfully removes most of these frames, which enables a reasonable trajectory of camera views to be extracted, although the structure for this sequence is still rather poor.

In FIG. 14 and FIG. 15, a side and a top view, respectively, are shown for the sequence David. This is a head and shoulders sequence, with a picture hanging on a wall behind. The person in the sequence acquired it by holding the camera with a stretched arm and performing an arched motion. Again, the motion of the center of the projection is negligible between a couple of frames near the end of the arc. With the SaM system used in the experiments, this tends to ruin all the points of the face, causing a decapitation. With preprocessing, the troublesome frames are removed and the problem is eliminated.

In summary, exemplary embodiments of the invention described above confer multiple benefits. For example, using the preprocessor the relatively expensive SaM processing can be performed on a smaller number of views. Another benefit is that some tedious manual tasks, such as segmentation of the raw video material into shots and the choice of frame rate for every shot, are automated through the use of the preprocessing mechanism. Furthermore, degeneracies due to insufficient motion can sometimes be avoided. Automatic processing can adapt to the motion and avoid any undue assumptions about the input frame rate. Furthermore, unsharp frames caused by bad focus, motion blur, etc. or a series of frames with low interdisparity can be discarded at an early stage.

The invention has been described with reference to particular embodiments. However, it will be readily apparent to those skilled in the art that it is possible to embody the invention in specific forms other than those of the preferred embodiments described above. This may be done without departing from the spirit of the invention.

For example, the preprocessor 100 has been illustrated as a separate processing mechanism to that of the video capture and the SaM processing. However, this is not essential. Rather, the inventive techniques can be adapted for use within the video camera or within the SaM processing mechanism.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of preprocessing a sequence of video frames, said method comprising the steps of:
   receiving the video sequence; and
   generating a set of views suitable for algorithmic processing, said generating step including the steps of:
   determining a motion estimation between the frames in the video sequence;
   selecting a frame for deletion if the motion estimation yields a final correlation coefficient above a predetermined threshold.

2. The method according to claim 1, wherein the motion estimation is a global motion estimation.

3. The method according to claim 1, wherein the motion estimation is a local motion estimation.

4. The method according to claim 1, further comprising the steps of:
   determining shot boundaries of the video sequence;
   dividing the video sequence into at least one subsequence of frames, wherein each of the at least one subsequence of frames corresponds to a particular shot in the video sequence;
   identifying redundant frames in the at least one subsequence of frames; and
   deleting from the at least one subsequence of frames any frames which are identified as redundant.

5. The method according to claim 4, wherein the shot boundaries are provided by the camera which captured the video sequence.

6. The method according to claim 4, wherein the step of determining the shot boundaries comprises the steps of:
   correlating adjacent frames in the video sequence after global motion compensation; and
   identifying, for each pair of adjacent frames, the second frame in the pair as a beginning of a new shot based on the correlation between the frames in the pair.

7. The method according to claim 1, wherein the video sequence is received from a video capture device in real-time.

8. A method of capturing a video sequence comprising the steps of:
   receiving video from a video capture device as a sequence of frames;
   for each frame in the sequence:
      calculating a motion estimation between the frame and a previously accepted frame; and
      identifying the frame as redundant if the motion estimation yields a final correlation coefficient above a predetermined threshold;
   accepting frames that are determined not to be redundant; and
   storing the accepted frames in storage device.

9. The method according to claim 8, further comprising the steps of:
   monitoring the rate at which accepted frames are provided to the storage device; and
   providing an indication to the user of the video capture device to decrease the motion of the camera, if the storage device is unable to process the accepted frames at the current rate.

10. A method of capturing a video sequence comprising the steps of:
   receiving video from a video capture device as a sequence of frames;
   for each frame in the sequence:
      calculating a motion estimation between the frame and all the previously accepted frames; and
      identifying the frame as redundant if the motion estimation yields a final correlation coefficient above a predetermined threshold;
   accepting frames that are determined not to be redundant; and
   storing the accepted frames in a storage device.

11. A preprocessor for preprocessing a received sequence of video frames and storing a decimated subset of frames suitable for Structure from Motion processing, said preprocessor comprising:
   means for determining a motion estimation between the frames in the video sequence;
   means for selecting a frame from the sequence to be intentionally deleted if the motion estimation for the frame and an adjacent frame yields a final correlation coefficient above a predetermined threshold; and
   means for deleting the selected frame.

12. The preprocessor of claim 11, wherein the means for selecting a frame to be intentionally deleted includes:
   means for determining whether the frame is essential for connectivity of the video sequence; and
   means for selecting the frame, responsive to a determination that the frame is not essential for connectivity of the video sequence.

13. The preprocessor of claim 11, wherein the means for selecting a frame to be intentionally deleted includes:
   means for determining a motion estimation between the frame and an adjacent frame in the video sequence; and
   means for selecting the frame, responsive to a determination that the motion estimation yields a final correlation coefficient above a predetermined threshold.

14. A method of preprocessing a sequence of video frames, said method comprising the steps of:
   (a) receiving the video sequence in a preprocessor;
   (b) sequentially analyzing each frame in the sequence to determine whether each frame differs from the previous adjacent frame by a difference that exceeds a predetermined threshold amount;
   (c) storing each analyzed frame that differs from the previous adjacent frame by a difference that exceeds the predetermined threshold amount;
   (d) deleting any frames that differ from the previous adjacent frame by an amount less than the predetermined threshold amount until a calculated total difference exceeds the predetermined threshold amount, said calculated total difference being the sum of the differences between each deleted frame and the deleted frame's previous adjacent frame;
   (e) storing the analyzed frame for which the total difference exceeds the predetermined threshold amount; and
   (f) repeating steps (b) through (e) until the entire video sequence has been analyzed, and a decimated subset to frames has been stored.

15. A method of preprocessing a sequence of video frames to produce a decimated subset of frames prior to further processing, said method comprising the steps of:
   receiving the sequence of video frames;
   selecting a frame from the sequence to be intentionally deleted, said selecting step including:
      determining a motion estimation between the frame and an adjacent frame in the video sequence; and
      selecting the frame if the motion estimation yields a final correlation coefficient above a predetermined threshold; and
   deleting the selected frame.

16. A system for preprocessing a video sequence to produce a set of views suitable for Structure from Motion processing, said system comprising:
- a source for a sequence of video frames;
- a storage medium; and
- a preprocessor connected to the source and the storage medium, comprising:
    - means for selecting a framed from the sequence to be intentionally deleted; and
    - means for deleting the selected frame;

wherein the means for selecting a frame to be intentionally deleted includes:
- means for determining a motion estimation between the frame and an adjacent frame in the video sequence; and
- means for selecting the frame, responsive to a determination that the motion estimation yields a final correlation coefficient above a predetermined threshold.

* * * * *

UNITED STATES PATENT AND TRADEMARK OFFICE
CERTIFICATE OF CORRECTION

PATENT NO. : 6,952,212 B2 Page 1 of 1
APPLICATION NO. : 09/808018
DATED : October 4, 2005
INVENTOR(S) : Nister et al.

It is certified that error appears in the above-identified patent and that said Letters Patent is hereby corrected as shown below:

In Column 2, Line 18, delete "but" and insert -- by --, therefor.

In Column 10, Line 61, in Claim 1, delete "sultable" and insert -- suitable --, therefor.

In Column 12, Line 52, in Claim 14, delete "to" and insert -- of --, therefor.

In Column 13, Line 8, in Claim 16, delete "framed" and insert -- frame --, therefor.

Signed and Sealed this

Twentieth Day of November, 2007

JON W. DUDAS
*Director of the United States Patent and Trademark Office*